(12) United States Patent
Weiss et al.

(10) Patent No.: US 8,092,772 B2
(45) Date of Patent: Jan. 10, 2012

(54) USE OF A NOZZLE FOR MANUFACTURING SODIUM PERCARBONATE

(75) Inventors: Uwe Weiss, Sonnefeld (DE); Michael Jacob, Weimar (DE); Elin Sohlberg, Helsingborg (SE); Ajse Sandqvist, Helsingborg (SE); Fredrik Lauritzson, Ramlösa (SE)

(73) Assignee: Kemira Kemi AB, Helsingborg (SE)

( * ) Notice: Subject to any disclaimer, the term of this patent is extended or adjusted under 35 U.S.C. 154(b) by 0 days.

(21) Appl. No.: 12/681,958

(22) PCT Filed: Oct. 9, 2008

(86) PCT No.: PCT/EP2008/063506
§ 371 (c)(1),
(2), (4) Date: Oct. 8, 2010

(87) PCT Pub. No.: WO2009/047281
PCT Pub. Date: Apr. 16, 2009

(65) Prior Publication Data
US 2011/0038782 A1    Feb. 17, 2011

(30) Foreign Application Priority Data

Oct. 9, 2007 (EP) .................................... 07118072
Oct. 12, 2007 (EP) .................................... 07118376

(51) Int. Cl.
*C01B 31/24* (2006.01)
(52) U.S. Cl. ................ 423/415.2; 252/186.27
(58) Field of Classification Search ............... 423/415.2; 252/186.27
See application file for complete search history.

(56) References Cited

U.S. PATENT DOCUMENTS

| | | | |
|---|---|---|---|
| 3,555,696 A | 1/1971 | Pistor et al. | |
| 4,428,914 A * | 1/1984 | Brichard et al. | 423/265 |
| 5,560,896 A * | 10/1996 | Bewersdorf et al. | 423/415.2 |
| 2006/0049281 A1 | 3/2006 | Jacob et al. | |

OTHER PUBLICATIONS

WO 95/06615A; Mar. 9, 1995; Abstract Only (1 page).
EP 0787682A; Aug. 6, 1997; Abstract Only (1 page).
DD 107426 A; Aug. 5, 1974; Translation of Claim 1 Only (1 page).
International Search Report; International Application No. PCT/EP2008/063506; Date of Mailing of the International Search Report Jan. 15, 2009 (3 pages).

* cited by examiner

*Primary Examiner* — Stuart Hendrickson
*Assistant Examiner* — Richard M Rump
(74) *Attorney, Agent, or Firm* — Thomas, Kayden, Horstemeyer & Risley, LLP

(57) ABSTRACT

The present invention relates to a use of a two-way spray nozzle (1) with protective gas for manufacturing granular sodium percarbonate, said nozzle comprising a central tube (2) having an outlet for an aqueous hydrogen peroxide solution, an inner jacket tube (3) arranged coaxially around the central tube, and having an outlet for aqueous sodium carbonate solution, an outer jacket tube (4) arranged coaxially around the central tube and inner jacket tube, and having an outlet for a protective gas, a threaded ring slot (5) arranged around the central tube at a distance from the outlet of the central tube, wherein the threads of the ring slot are arranged at an angle α with respect of the direction of the longitudinal axis (12) of the central tube, and in which said protective gas is used at a pressure of less than 0.7 bar. The present invention also relates to a method for manufacturing granular sodium percarbonate.

11 Claims, 2 Drawing Sheets

USE OF A NOZZLE FOR MANUFACTURING SODIUM PERCARBONATE

CROSS REFERENCE TO RELATED APPLICATIONS

This is a U.S. national stage of application No. PCT/EP2008/063506, filed on 9 Oct. 2008, the disclosure of which are also incorporated herein by reference.

FIELD OF THE INVENTION

The present invention relates to a use of a two-way spray nozzle with protective gas for manufacturing granular sodium percarbonate. The nozzle comprises a central tube having an outlet for an aqueous hydrogen peroxide solution, an inner jacket tube arranged coaxially around the central tube, and having an outlet for aqueous sodium carbonate solution, an outer jacket tube arranged coaxially around the central tube and inner jacket tube, and having an outlet for a protective gas, and a threaded ring slot arranged between the central tube and the inner jacket at a distance from the outlet of the central tube, wherein the threads of the ring slot are arranged at an angle $\alpha$ with respect of the direction of the longitudinal axis of the central tube. The present invention also relates to a method for manufacturing granular sodium percarbonate.

BACKGROUND OF THE INVENTION

The prior art knows several different nozzles for manufacturing granulated sodium percarbonate. For example, document EP 716 640 presents a process for the production of granulated sodium percarbonate. The process uses a three-way atomiser nozzle having a central tube and two jacket tubes arranged coaxially around the central tube, the central tube extending beyond the jacket tubes by at least one radius of the central tube at the nozzle tip. One of the solutions is introduced into the central tube, second of the solutions is introduced into the annular gap formed between the central tube and the inner jacket tube, and propellant gas is introduced into the outer annular gap formed between the jacket tubes.

Publication EP 787 682 describes also a process for the production of granulated sodium percarbonate. This process uses a four-way atomiser nozzle having a central tube and three jacket tubes arranged coaxially around the central tube. In the process, one of the solutions is introduced into the central tube, the propellant gas is introduced into the annular gap formed between the central tube and the inner (=first) jacket tube, the suspension is introduced between the annular gap formed between the first and second jacket tubes and the propellant gas is introduced into the outer annular gap formed between the jacket tubes.

Document US 2006/0049281 presents a nozzle for spraying liquid substances. The nozzle includes a cylindrical nozzle body and a nozzle mouth piece. Said nozzle body includes an inner tube and an outer tube, the inner tube being connected to a supply for a substance to be sprayed, and the outer tube being connected to a supply for an atomising gas or carrier gas.

All these prior art nozzles, however, use pressurised air as atomising gas and carrier gas, as its function is to both atomise the liquids and to form the droplets. The problems associated with this are, i.e., important need for pressurised air, which is rather costly in the point of view of operation, maintenance and investment.

OBJECTS AND SUMMARY OF THE INVENTION

An object of the invention is to minimise or entirely prevent the problems existing with the prior art solutions.

In view of the above-mentioned, it is an object of the present invention to provide for a use of a nozzle for manufacturing granulated sodium percarbonate, which uses a lower pressure of air, so that its operating costs can be decreased when compared to prior art nozzles. Moreover, it is an object of the present invention to provide for a use of a nozzle that is less subject to clogging and maintenance than known nozzles.

These objects are at least partially attained by the use according to the present invention, especially with the characteristics presented below in the characterising parts of the independent claims.

A typical use according to the present invention is the use of a two-way spray nozzle with protective gas for manufacturing granular sodium percarbonate, said nozzle comprising
  a central tube having an outlet for an aqueous hydrogen peroxide solution,
  an inner jacket tube arranged coaxially around the central tube, and having an outlet for aqueous sodium carbonate solution,
  an outer jacket tube arranged coaxially around the central tube and inner jacket tube, and having an outlet for a protective gas,
  a threaded ring slot arranged between the central tube and the inner jacket tube at a distance from the outlet of the central tube, wherein the threads of the ring slot are arranged at an angle $\alpha$ with respect of the direction of the longitudinal axis of the central tube,
whereby the carbonate solution is formed into droplets mainly by a centrifugal force induced by a swirling motion of the carbonate solution achieved by using the threaded ring slot and the said protective gas is used at a pressure of less than 0.7 bar.

The present invention also relates to a method for manufacturing granular sodium percarbonate. In a typical method according to the present invention,
  an aqueous hydrogen peroxide solution is added to said reactor through a central tube of a nozzle,
  an aqueous sodium carbonate solution is added to said reactor through an inner jacket tube arranged coaxially around said central tube and through a threaded ring slot arranged between the central tube and the inner jacket tube, wherein the threads of the ring slot are arranged at an angle $\alpha$ with respect of the direction of the longitudinal axis of the central tube,
  protective gas is added to said reactor through an outer jacket tube arranged coaxially around the central tube and inner jacket tube, and
  the aqueous sodium carbonate solution is formed into droplets mainly by a centrifugal force induced by the swirling motion of the carbonate solution achieved by the threaded ring slot, and said protective gas is added at a pressure of less than 0.7 bar.

DETAILED DESCRIPTION OF THE INVENTION

Now it has been surprisingly found out that by using a two-way spray nozzle with threaded ring slot it is possible to achieve such a powerful swirling motion to the carbonate solution that the solution is broken into droplets mainly by the centrifugal force induced by the swirling motion. As the carbonate solution is formed into droplets mainly by centrifugal force, it is not necessary to use compressed gas, such as air, for the droplet formation. It was surprisingly noticed that it was possible to use protective gas at a pressure of less than 0.7 bar and still obtain good droplet formation and mixing of the two solutions. At the same time it was noticed that clogging near the nozzle tip was reduced.

In this application the term "threaded ring slot" means a ring-formed bushing or a sleeve that is arranged around the central tube, in intimate contact with the central tube. The bushing or sleeve has an inner face towards the central tube and an outer face towards the inner jacket tube. The threads have been arranged to the outer face of the sleeve or bushing, preferably helically around the longitudinal axis of the bushing or the sleeve.

In this application the term "protective gas" means gas that is ejected from the outer jacket tube into the reactor. The main function of the protective gas exited from the nozzle is to keep the constituents of the process fluidized in the reactor and to inhibit their clogging to the nozzle tip. The protective gas is not, at least to a large degree, responsible for the droplet formation of the carbonate solution. However, it may assist in internal mixing processes in the reactor, outside the nozzle.

In this application the term "two-way nozzle" means a nozzle having in the ejecting end of the nozzle a central tube opening and two ring-like tube openings surrounding, coaxially, the central opening. The nozzle is used for introducing two solutions into a reaction, protected by protecting gas. The central opening is intended for the first solution, the first ring-like opening in intimate contact with and surrounding the central opening is intended for the second solution, and the second ring-like opening in intimate connection and surrounding the first opening is intended for protective gas.

A typical use of according to the present invention is the use of a two-way spray nozzle with protective gas for manufacturing granular sodium percarbonate, said nozzle comprising a central tube having an outlet for an aqueous hydrogen peroxide solution,
an inner jacket tube arranged coaxially around the central tube, and having an outlet for aqueous sodium carbonate solution,
an outer jacket tube arranged coaxially around the central tube and inner jacket tube, and having an outlet for a protective gas,
a threaded ring slot arranged between the central tube and the inner jacket tube at a distance from the outlet of the central tube, wherein the threads of the ring slot are arranged at an angle $\alpha$ with respect of the direction of the longitudinal axis of the central tube, and in which said protective gas is used at a pressure of less than 0.7 bar.

According to an embodiment of the invention, the protective gas is used at a pressure of less than 0.5 bar, preferably less than 0.3 bar.

In the prior art nozzles, the atomising gas is typically used at pressures of 1 to 3.6 bar. Therefore, as the present use provides for a nozzle which only needs a pressure of the protective gas of less than 0.7 bar, the need for pressurised gas is greatly decreased.

Moreover, in the nozzle used in the present invention, the droplets of liquids are formed by a pressure difference in the liquid outlets over the nozzle, instead of the compressed, atomising air in the prior art nozzles. In the present invention, air is thus used for fluidising, i.e. for keeping the granules in the fluid bed where the granules of sodium percarbonate are formed, above the nozzle to avoid clogging of the bed material on the nozzle head.

According to a preferred embodiment of the invention, said protective gas is air. As the pressure needed is so low, it is possible to use simply a blowing machine, such as fan, blower or the like, instead of compressor for compressed air. This reduces the energy consumption of the process. Typically the maintenance of the blowing apparatuses is simpler than compressor systems, and they may also be more reliable in industrial scale processes.

According to one embodiment of the invention, the nozzle forms droplets having a narrow size distribution. The mean diameter of the droplets can vary from 50 to 1000 micrometers. A typical droplet size is around 500 micrometers, ranging from 300 to 600 micrometers. Generally the carbonate droplets that are formed by the centrifugal force as described in the present invention are slightly larger in size than droplets that would be formed when using compressed air for atomising carbonate solution. The larger droplet size provides for longer droplet lifetime, i.e. the water evaporation from the droplet takes longer, improving and increasing the possibility for an individual droplet to hit an agglomerate or agglomerate seed in the reactor. This way the present invention also improves the overall process economy.

It is known in the art that by using compressed air, it is possible to make a quite wide range of droplet size. However, with the present invention, the droplets are more homogeneous in size than with the prior art nozzles using compressed air. A more homogenous droplet size makes it easier to control the process of making granular sodium percarbonate and the effect could be carried off to the final product, also.

Due to the present use, it is possible to make nozzles having larger opening for the aqueous sodium carbonate solution, also called soda ash, which in turn leads to less clogging. On the other hand, it is also possible to make more robust threads on the threaded ring slot and to use larger tolerances, which in turn makes the nozzles less maintenance intensive. All these features lead to lesser manufacturing, maintenance and use costs. According to one preferred embodiment of the present invention the central tube of the nozzle does not extend over the nozzle tip. This means that the central tube is substantially of the same length as the inner and outer jacket tubes.

Another advantage of the present invention is that the exit velocity of the droplets from the nozzle is significantly decreased compared to traditional nozzles used in the manufacturing of sodium percarbonate. Indeed, the exit velocity in the traditional nozzles is in the order of 50 m/s, whereas in the present invention this exit velocity is only in the order of 10-30 m/s.

According to the invention, the pressure difference between the liquids entering and leaving the nozzle is from 4 to 8 bars. By the pressure difference it is meant the energy used for atomisation. This is also clearly lower than in the known sodium percarbonate two-way nozzles, i.e in the nozzles where air is not used for atomisation.

In the present invention, the mass ratio of air to liquid is preferably 0.05-0.1.

According to an embodiment of the invention, the pressure of the protective gas can be selected from 0.01, 0.05, 0.1, 0.15, 0.20, 0.25, 0.3, 0.4, 0.45, 0.5, 0.55, 0.6 or 0.65 bar up to 0.05, 0.1, 0.15, 0.20, 0.25 0.28, 0.3, 0.4, 0.45, 0.5, 0.55, 0.6 or 0.70 bar. Some suitable ranges for the pressure are for example 0.01-0.7 bar, 0.01-0.5 bar, 0.1-0.3 bar, 0.1-0.25 bar or 0.01-0.1 bar.

The threads of the threaded ring slot are preferably helical or spiral in relation to the longitudinal axis of the slot and the nozzle itself. According to an embodiment of the invention, the angle $\alpha$ is 1-89° with respect of the direction of the longitudinal axis of the central tube. This angle $\alpha$ can for example be from 1, 3, 5, 10, 20, 25, 30, 40, 50, 65, 70 or 80° up to 3, 5, 10, 20, 25, 30, 40, 50, 65, 70, 80 or 89° with respect of the direction of the longitudinal axis of the central tube. Some suitable ranges are for example 1-80°, 1-3° or 5-25° with respect of the direction of the longitudinal axis of the central tube. The angle can be measured either clock wise or counter clock wise.

The present invention uses a threaded ring slot around the central tube, and its function is to push the liquid in spiral, so that atomisation of the solution is obtained with this spiral movement of the solution instead of compressed gas, such as compressed air.

According to yet another embodiment of the invention, the nozzle used in the present invention comprises a nozzle body comprising a central tube, an inner jacket tube, an outer jacket tube and a threaded ring slot. The nozzle body is connected to fluid pipes. The other ends of said fluid pipes are connected to a connection body, which has an inlet for the hydrogen peroxide solution, an inlet for the sodium carbonate solution and an inlet for the protective gas.

The present invention also relates to a method for manufacturing granular sodium percarbonate. In a typical method according to the present invention, an aqueous hydrogen peroxide solution is added to said reactor through a central tube of a nozzle, an aqueous sodium carbonate solution is added to said reactor through an inner jacket tube arranged coaxially around said central tube and through a threaded ring slot arranged between the central tube and the inner jacket tube, wherein the threads of the ring slot are arranged at an angle α with respect of the direction of the longitudinal axis of the central tube protective gas is added to said reactor through an outer jacket tube arranged coaxially around the central tube and inner jacket tube.

According to the invention, said protective gas is used at a pressure of less than 0.7 bar.

The details and embodiments mentioned above in connection with the use apply to the method according to the invention.

The invention is described in more detail with reference to the drawing. The Figures are to be taken as purely schematical and are not to be construed as limiting the scope of the claims. Moreover, the reference numerals in the claims are also not to be construed as limiting the scope of the claims.

BRIEF DESCRIPTION OF THE DRAWINGS

Embodiment of the invention are described in more detail below with reference to the enclosed figures, where.

DETAILED DESCRIPTION OF THE DRAWINGS

Figure 1:
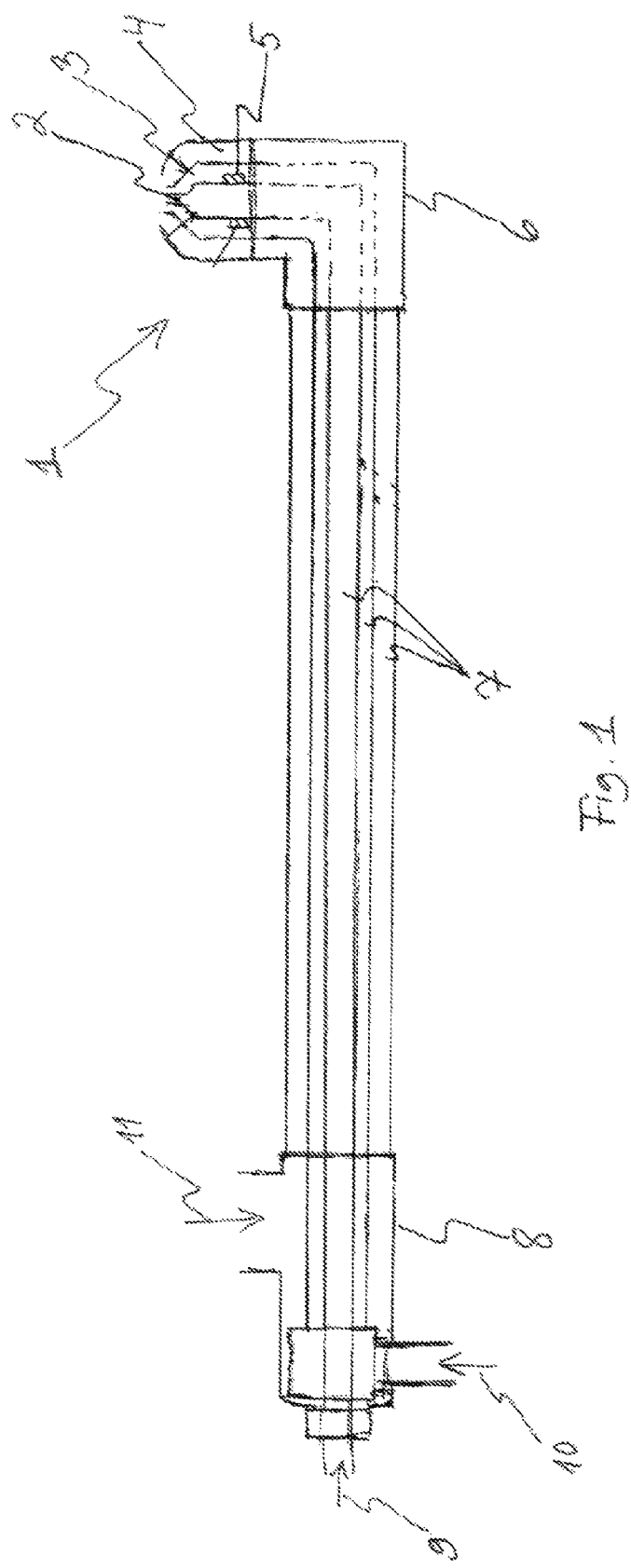
FIG. 1 shows schematically a nozzle arrangement according to one embodiment of the present invention.

FIG. 1 shows a nozzle arrangement according to the present invention in a schematical way and in cross section. In the Figure, there are shown a two-way spray nozzle 1 with protective gas, having a central tube 2, an inner jacket tube 3 arranged coaxially around the central tube 2, an outer jacket tube 4 arranged coaxially around the central tube 2 and inner jacket tube 3 as well as a threaded ring slot 5 arranged around the central tube 2 at a distance from the outlet of the central tube.

All these parts are arranged on a nozzle body 6, and connected to three separate fluid pipes 7, one fluid pipe for each solution and protective gas. The other ends of said fluid pipes 7 are connected to a connection body 8, which has an inlet for the hydrogen peroxide solution 9, an inlet for the sodium carbonate solution 10 and an inlet for the protective gas 11.

The aqueous hydrogen peroxide solution is introduced into the reaction chamber through the circular opening of the central tube 2. The inner diameter of the central tube 2 decreases just before the opening of the tube 2. The peroxide solution is fed to the central tube 2 by one of the fluid pipes 7, to which the peroxide solution is introduced by inlet 9.

At the outer wall of the central tube 2, in intimate connection with it, is arranged the threaded ring slot 5. In other words, the threaded ring slot is arranged into the space that is defined by the outer wall surface of the central tube 2 and the inner wall surface of the inner jacket tube 3. The threaded ring slot is arranged at a distance from the nozzle tip and the ring-like opening of the inner jacket tube 3. When the sodium carbonate solution passes the threaded ring slot on its way from the carbonate inlet 10, through second fluid pipe 7, to the opening of the inner jacket tube, it is forced into a swirling, spiralling motion by the oblique or skew threads of the ring slot 5. The rotating motion of the solution evokes droplet formation due to the centrifugal force created to the solution.

The protective gas is introduced into the reaction chamber through the ring like opening of the outer jacket tube. The flow space for protective gas in the nozzle is defined by the outer wall surface of the inner jacket tube 3 and the inner wall surface of the outer jacket tube 4. Generally, no threaded ring slot is arranged into this space, outside the inner jacket tube, whereby the protective gas is not introduced into a swirling motion. The protective gas is fed to outer jacket tube in the nozzle body through a fluid pipe 7 which is connected to an inlet 11, which is connected to a blower or a fan (not shown).

Figure 2:
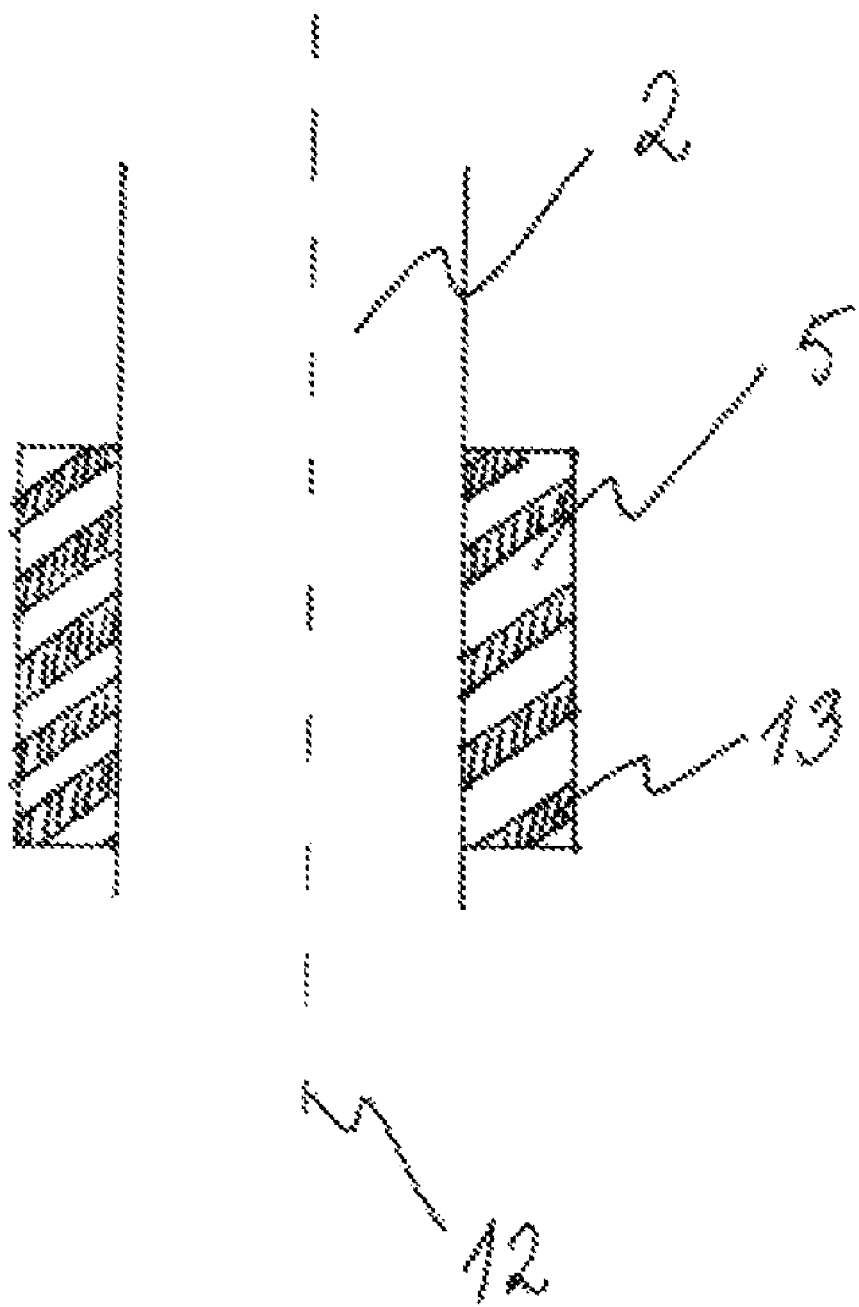
FIG. 2 shows schematically a detail of FIG. 1.

FIG. 2 shows the threaded ring slot 5 in a more detailed manner. In this Figure, it can be seen that the threads 13 of the ring slot 5 are arranged at an angle α with respect of the direction of the longitudinal axis 12 of the central tube 2. It is to be bear in mind that the threads 13 are only shown in a schematic manner.

Even if the invention has been described with reference to what is presently considered to be the most practical and preferred embodiments, it must be understood that the invention shall not be limited to the above-described embodiments, but that it is intended to include also different modifications and equivalent technical solutions within the scope of the enclosed claims.

The invention claimed is:

1. A method for manufacturing granular sodium percarbonate in a fluidized bed reactor, comprising:

adding an aqueous hydrogen peroxide solution to said reactor through a central tube of a nozzle, adding an aqueous sodium carbonate solution to said reactor through an inner jacket tube arranged coaxially around said central tube and through a threaded ring slot arranged between the central tube and the first jacket tube, wherein the threads of the ring slot are arranged at an angle α with respect of the direction of the longitudinal axis of the central tube, and adding a protective gas to said reactor through an outer jacket tube arranged coaxially around the central tube and inner jacket tube, wherein the aqueous sodium carbonate solution is formed into droplets mainly by a centrifugal force induced by the swirling motion of the carbonate solution achieved by the threaded ring slot, and wherein said protective gas is added through the outer jacket tube at a pressure of less than 0.7 bar.

2. The method of claim 1, wherein the pressure is less than 0.5 bar.

3. The method of claim 1, wherein the pressure is less than 0.3 bar.

4. The method of claim 1, wherein the pressure is 0.01-0.28 bar.

5. The method of claim 1, wherein the pressure is 0.1-0.25 bar.

6. The method of claim 1, wherein the pressure is 0.01-0.1 bar.

7. The method of claim 1, wherein said angle $\alpha$ is 1-89° with respect to the direction of the longitudinal axis of the central tube.

8. The method of claim 1, wherein said angle $\alpha$ is 1-80° with respect to the direction of the longitudinal axis of the central tube.

9. The method of claim 1, wherein said angle $\alpha$ is 1-3° with respect to the direction of the longitudinal axis of the central tube.

10. The method of claim 1, wherein said angle $\alpha$ is 5-25° with respect to the direction of the longitudinal axis of the central tube.

11. The method of claim 1, wherein said protective gas is air.

* * * * *